Figure 1:
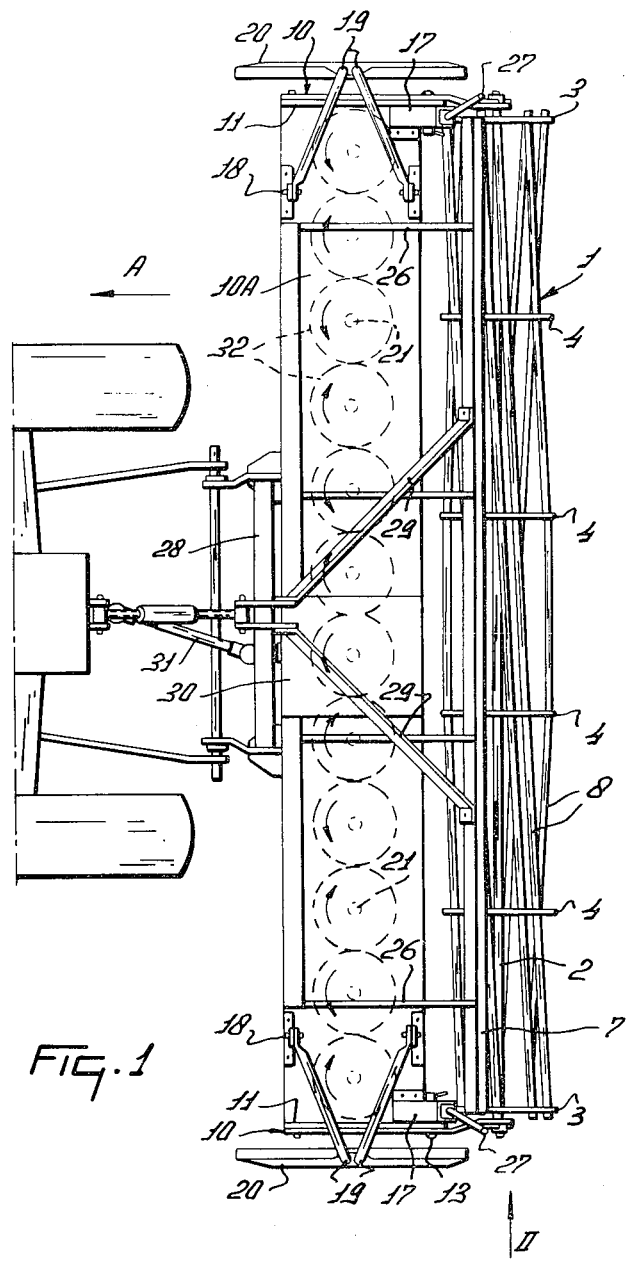

United States Patent [19]
van der Lely et al.

[11] 3,899,030
[45] Aug. 12, 1975

[54] SOIL COMPRESSING MEMBERS

[76] Inventors: Ary van der Lely, 10, Weverskade, Maasland; Cornelis Johannes Gerardus Bom, 36, Esdoornlaan, Rozenburg, both of Netherlands

[22] Filed: Sept. 4, 1973

[21] Appl. No.: 394,279

Related U.S. Application Data

[63] Continuation of Ser. No. 208,698, Dec. 16, 1971, abandoned.

[30] Foreign Application Priority Data
Dec. 18, 1970 Netherlands............. 7018468

[52] U.S. Cl. ............ 172/68; 172/59; 172/532; 172/549; 172/552
[51] Int. Cl. ............ A01b 9/00; A01b 33/16
[58] Field of Search ............ 172/59, 63, 68, 71, 72, 172/110, 111, 121, 170, 173, 184, 532, 537, 539, 549, 550, 552, 612

[56] References Cited
UNITED STATES PATENTS

| | | | |
|---|---|---|---|
| 557,006 | 3/1896 | Miller | 172/552 X |
| 922,505 | 5/1909 | Porter | 172/552 |
| 1,627,422 | 5/1927 | Wike | 172/113 |
| 3,616,862 | 11/1971 | van der Lely | 172/68 X |

FOREIGN PATENTS OR APPLICATIONS

| | | | |
|---|---|---|---|
| 6,805,358 | 10/1969 | Netherlands | 172/111 |
| 233,885 | 6/1964 | Austria | 172/552 |
| 108,221 | 10/1967 | Denmark | 172/184 |
| 1,187,840 | 2/1965 | Germany | 172/552 |
| 1,927,422 | 1/1970 | Germany | 172/110 |
| 6,908,785 | 12/1970 | Netherlands | |

Primary Examiner—Edgar S. Burr
Assistant Examiner—Paul T. Sewell
Attorney, Agent, or Firm—Mason, Mason & Albright

[57] ABSTRACT

An agricultural implement for attachment to a prime mover has soil working members, such as tines, for cultivating purposes and a soil compressing member rotatably mounted on adjustable arms to trail the soil working members. The soil compressing member is an elongated structure with spaced apart, plate-shaped, supports that have holders arranged around each of their peripheries. Elongated soil contacting flexible elements are connectable to any of the holders on the supports so that the elements can be helically or otherwise disposed on the supports for the working width of the implement. Varying the position of the arms results in changing the position of the soil working members relative to the soil compressing member and the working depth of the former.

11 Claims, 6 Drawing Figures

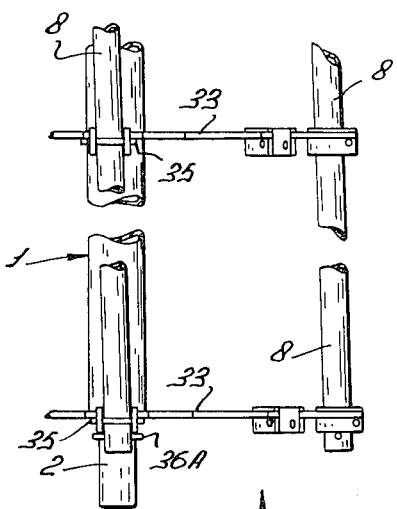
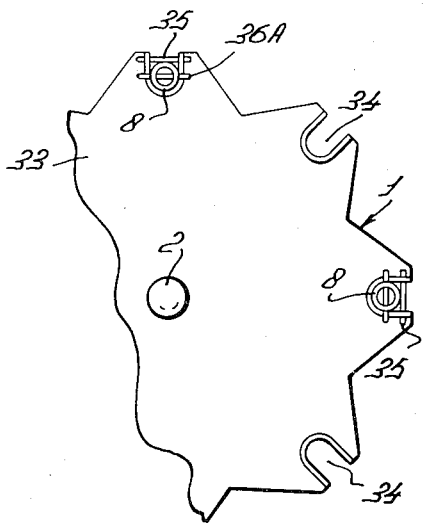
FIG.3  FIG.4
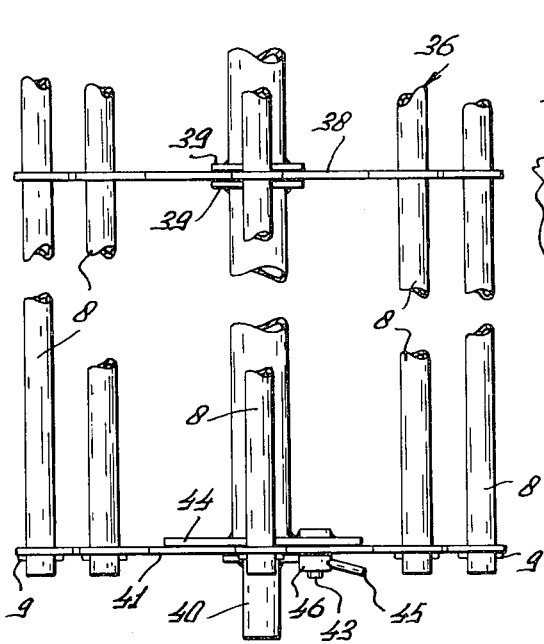
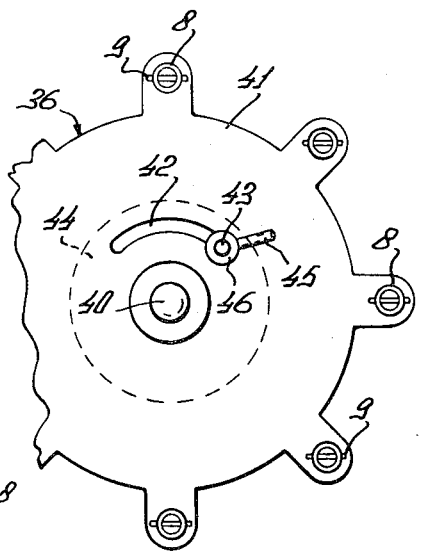
FIG.5  FIG.6

SOIL COMPRESSING MEMBERS

This is a continuation of application Ser. No. 208,698 filed Dec. 16, 1971, now abandoned.

This invention relates to soil compressing members of the kind that are intended to be rotatably mounted to consolidate a strip of previously worked soil and that comprise a plurality of peripheral and relatively spaced elongated elements each of which extends lengthwise in a similar direction to the intended axis of rotation.

Known soil compressing members of this kind can only be used effectively on certain types of soil. For example, when the elongated elements are only spaced at short distances from each other, the soil compressing member concerned will only operate satisfactorily on light and relatively dry soils. Any attempt to use the member on heavy and sticky soil results in rapid clogging of the whole member with mud and the like so that the smooth consolidating effect of the member is largely lost. This is particularly undesirable when preparing a seedbed because clods of muds and earth fall from the rotating member and are left on the otherwise consolidated seedbed where they hinder or prevent the subsequent emergence of the seedling plants. An object of this invention is to provide a soil compressing member which can avoid, or at least markedly reduce, the discussed disadvantage of known members of the kind set forth above.

According to one aspect of the invention, there is provided a soil compressing member of the kind set forth, wherein each elongated element is, or can be, disposed helically around the intended axis of rotation, at least one such element being releasably mounted to enable the element spacing to be charged in dependence upon the nature and condition of the soil which member is to compress.

Figure 2:
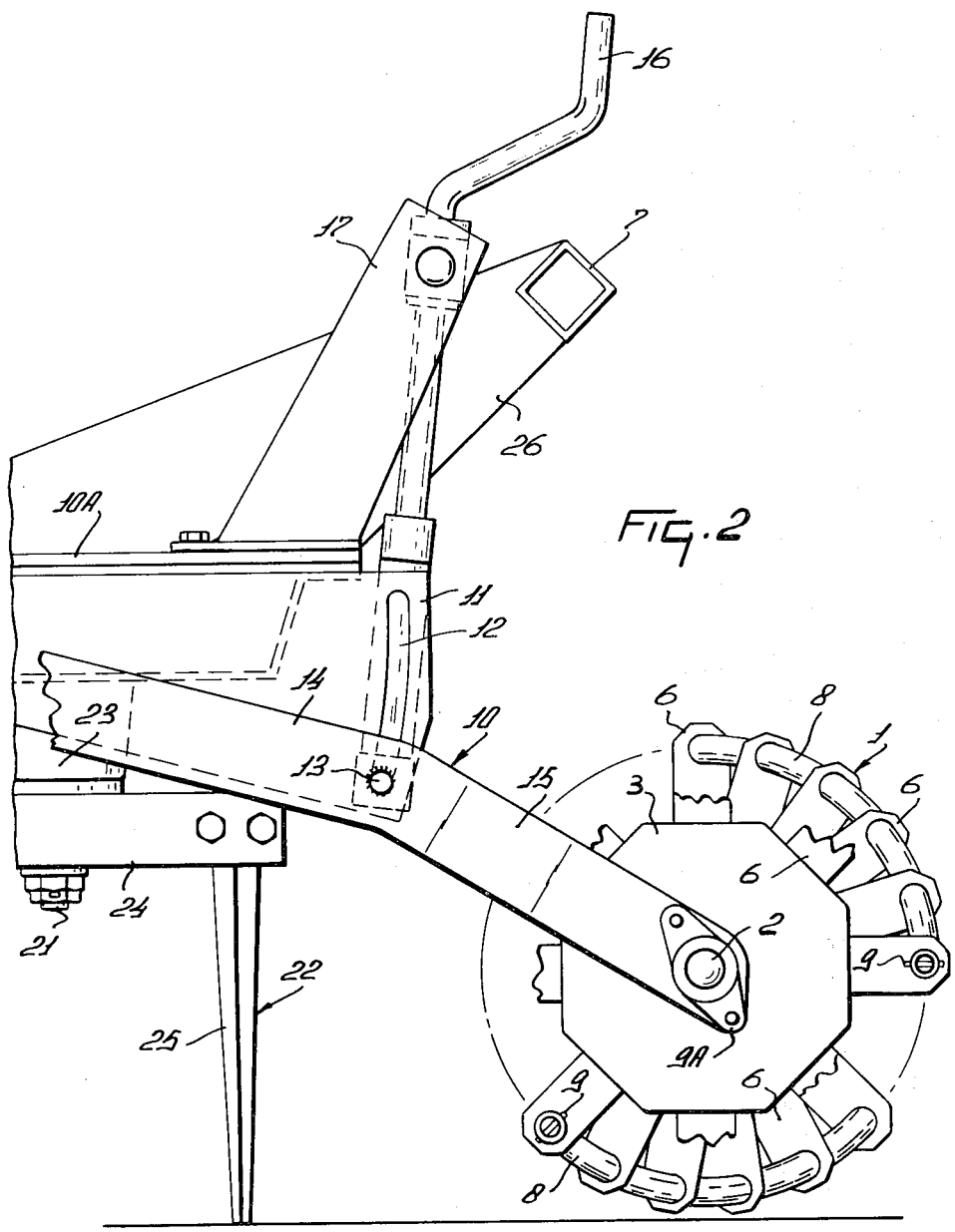

For a better understanding of the invention, and to show how the same may be carried into effect, reference will now be made, by way of example, to the accompanying drawings, in which:

FIG. 1 is a plan view of a cultivator provided with a soil compressing member in accordance with the invention, the cultivator being connected to the rear of an agricultural tractor, FIG. 2 is an elevation, to an enlarged scale, as seen in the direction indicated by an arrow II in FIG. 1, FIG. 3 is a plan view, to an enlarged scale, of an alternative construction of the soil compressing member to that shown in FIGS. 1 and 2 of the drawings, FIG. 4 is an elevation as seen in the direction indicated by an arrow IV in FIG. 3, FIG. 5 is a similar view to FIG. 3 but illustrates an alternative construction in which adjustment of parts of the soil compressing member can be effected, and FIG. 6 is an elevation as seen in the direction indicated by an arrow VI in FIG. 5.

Referring to FIGS. 1 and 2 of the drawings, a soil cultivating implement or cultivator is illustrated which includes a soil compressing member 1 which extends substantially horizontally perpendicular to the intended direction of operative travel of the cultivator that is indicated by an arrow A in FIG. 1 of the drawings. The member 1 is of substantially cylindrical overall shape and has a central rotary shaft 2 that is also substantially horizontally perpendicular to the direction A. The member 1 has two plate-like supports 3 at its opposite ends and four further plate-like supports 4 that are arranged between the supports 3 at locations such that the distances between the neighbouring supports 4, and between the neighbouring supports 3 and 4, are all substantially equal. The supports 3 and 4 are all secured centrally to the shaft 2. Each plate-like support 3 and 4 is of octagonal shape and a corresponding arm 6 projects radially outwardly (with respect to the shaft 2) from the midpoint of each of the eight edges of each support so that angles of 45° are enclosed between the two arms 6 that correspond to two neighbouring edges of each vertical support 3 or 4. Adjacent its outermost end, each arm 6 is formed with a hole through which an elongated element in the form of a tube 8 is entered. The angular disposition of the edges of the two octagonal supports 3 with respect to the shaft 2 is the same but the supports 4 that are disposed between them are displaced successively by eighteen degrees around the axis of the shaft 2. As can be seen in FIG. 2 of the drawings in respect of two of the tubes 8, each tube 8 is wound helically around the axis of the shaft 2 and is entered through the holes in the ends of six arms 6 each of which corresponds to a single one of the six supports 3 and 4. The result is that, as seen in side elevation (FIG. 2), each tube 8 subtends a total angle of 90° at the longitudinal axis of the shaft 2. There is, of course, a total of eight of the tubes 8 of which only two tubes are shown in FIG. 2 and it will be noted that the total angle (90°) which each tube 8 subtends at the longitudinal axis of the shaft 2, as seen in side elevation, is double the angle (45°) between successive tubes 8 around the longitudinal axis of the shaft 2. Transverse "safety" pins 9 are entered through opposite end regions of each tube 8 beyond the relatively remote surfaces of the arms 6 that correspond to the two supports 3 and abutment of the pins 9 against said surfaces of the arms 6 prevents displacement of the tubes 8 in the direction of the longitudinal axis of the shaft 2 to any appreciable extent. However, the tubes 8 fit quite loosely in the holes through the outer ends of the arms 6 so that, during operation, the tubes 6 can turn in those holes.

It is by no means essential that the elongated elements should be in the form of the illustrated circular cross-section tubes 8. Elements of angular cross-section may be employed as alternatives and, in either case, the elements may be formed from a resilient material such as spring steel. The elements may also be entirely flexible and be formed from, for example, lengths of strong wire having sheaths of rubber or a synthetic plastics material. The opposite ends of the central rotary shaft 2 are journalled in horizontal bearings 9A mounted at the rearmost ends, with respect to the direction A, of arms 10 of the cultivator. The leading ends of the arms 10 are turnable upwardly and downwardly with respect to the frame of the cultivator about pivots defining a substantially horizontal axis. The frame of the cultivator includes a hollow beam 10A that extends substantially horizontally perpendicular to the direction A and thus parallel to the axis of rotation of the shaft 2. The pivotal connections between the leading ends of the arms 10 and the frame of the cultivator are located at the opposite ends of the hollow beam 10A and at the front thereof with respect to the direction A. To this end, vertical plates 11 are provided at the opposite ends of the beam 10A, said plates 11 having a progressively increasing vertical extent in a direction opposite to the direction A (see FIG. 2). The rearmost ends of the plates 11 are formed with curved slots 12 whose centres of curvature coincide with the pivotal connections between the arms 10 and the beam 10A, a horizontal pin 13 rigidly secured to each arm 10 being entered in the corresponding slot 12. Each pin 13 is located approximately midway along the length of the corresponding arm 10 at an angular junction between a forward portion 14 and a rearward portion 15 thereof. The angular junctions are such that the rearward portions 15 are downwardly inclined with respect to the forward portions 14 and it will be noted that, when the pins 13 are located at the upper ends of the slots 12, the corresponding forward portions 14 of the two arms 10 are substantially horizontally disposed whilst the corresponding rearward portions 15 are still inclined downwardly and rearwardly from said angular junctions with respect to the direction A. As can be seen in plan view (FIG. 1), both rearward portions 15 of the two arms 10 are cranked inwardly with respect to the centre of the member 1 so that the opposite ends of the central shaft 2 do not project laterally of the cultivator frame beyond the forward portions 14 of the arms 10.

Each pin 13 is displaceable along the length of the corresponding slot 12 and is pivotally connected to a block that is mounted on the screwthread of a corresponding spindle 16 having a cranked operating handle 27 at its uppermost end. Each spindle is turnable about a horizontal pivot with respect to a corresponding support 17 that projects upwardly from the top of the hollow beam 10A, the parts which effect the connection between the spindle 16 and the pivot in each case being such that the spindle can be rotated readily with respect to said parts but cannot be axially displaced relative thereto to any appreciable extent. The blocks to which the pins 13 are pivotally connected are slidable upwardly and downwardly and rotation of either spindle 16, with the aid of the corresponding handle 27, will thus cause the corresponding pin 13 to be moved either upwardly, or downwardly, along the slot 12 through which it is entered and will thus lower, or raise, the corresponding end of the soil compressing member 1 with respect to the frame of the cultivator.

Plates 20 that are normally substantially vertically disposed, and that extend parallel to the direction A, are located immediately beyond the opposite lateral ends of the beam 10A. The plates 20 are carried by pairs of arms 19 which arms are pivotally connected to the top of the beam 10A by pivots 18 which define axes extending substantially horizontally parallel to the direction A. The plates 20 can turn upwardly and downwardly about said axes to some extent during operation of the cultivator but, when the cultivator is undergoing inoperative transport, the arms 19 that carry the plates 20 can be tilted upwardly through approximately 180° about the corresponding pivots to bring the plates 20 to inverted positions in which they lie on top of the beam 10A at some distance from the opposite ends of that beam.

The hollow beam 10A carries a row of soil working members 22 beneath it that are preferably twelve in number as illustrated in FIG. 1 of the drawings. Each soil working member 22 is carried by a corresponding vertical or substantially vertical shaft 21 that is rotatable in a corresponding bearing 23 at the bottom of the beam 10A. Each shaft 21 carries a tine support 24 at its lower end to which two tines 25 are clamped by bolts. Each tine 25 has an upper fastening portion and a lower soil-engaging portion which is bent over with respect to the fastening portion. The tines 25 will usually be connected to their supports 24 in such a way that the soil-engaging portions thereof trail rearwardly with respect to the direction of rotation of the corresponding shaft 21 but there are operating conditions under which it is preferable that they should project forwardly with respect to said direction of rotation. Each tine 25 is of square or other angular cross-section and tapers progressively in a downward direction towards its tip. The perpendicular distance between the axes of rotation of two neighbouring shafts 21 is preferably substantially 25 centimetres and the perpendicular distance between the tips of the two tines 25 of each member 22 is a little greater so that the strips of land worked by the individual members 22 during operation of the cultivator overlap to produce a single broad strip of worked land having a width of substantially 300 centimetres. Four vertical supporting plates 26 are provided on top of the hollow beam 10A at locations close to the two sets of pivots 18 and at equal distances from the midpoint of the beam 10A. The plates 26 project upwardly and rearwardly beyond the beam 10A with respect to the direction A (see FIG. 2) and their rearmost extremities are interconnected by a supporting beam 7 that extends parallel to the beam 10A and to which seed drills, fertiliser spreaders and/or other individual or combined agricultural implements that are to work in conjunction with the cultivator can be secured. A trestle-shaped coupling member 28 is mounted at the front of the beam 10A with respect to the direction A and can be connected to the three-point lifting device or hitch of an agricultural tractor or other operating vehicle in known manner as illustrated in outline in FIG. 1. Bars 29 that diverge rearwardly with respect to the direction A interconnect the apex of the coupling member 28 and two locations on the supporting beam 7 that are well spaced apart from one another in a direction perpendicular to the direction A.

A gear box 30 is mounted on top of the hollow beam 10A and has its output in driving connection with one of the underlying shafts 21. A rotary input shaft projects forwardly in the direction A from the gear box 30 and can be placed in driven connection with the power take-off shaft of the operating tractor or other vehicle by way of an intermediate telescopic transmission shaft 31 of known construction having universal joints at its opposite ends. The gear box 30 is located above one of the centre pair of soil working members 22 and rotation is transmitted from the corresponding shaft 21 to the driving shafts 21 of the other soil working members 22 by a row of spur-toothed pinions 32 located inside the beam 10A with their teeth in successive intermeshing engagement.

FIGS. 3 and 4 of the drawings show an alternative soil compressing member 1 in which the octagonal supports 3 and 4 that have previously been described are replaced by support plates 33 each of which has eight circumferential projections that are each provided with a member affording a U-shaped recess 34 that has a short extent in the axial direction of the shaft 2. A "safety" pin 35 can be entered transversely through holes in the two limbs of each recess member 34 to prevent the corresponding tube 8 or other elongated member from being displaced outwardly of that recess. Further safety pins 36A are entered transversely through the tubes 8 or other elongated members immediately beyond the support plates 33 at the opposite ends of the soil compressing member 1 and serve the same functions as the previously described transverse safety pins 9. The recesses that are formed between the projections that carry the recess members 34 act to prevent, or greatly to minimise, the adhesion of soil to the support portions that are located between the tubes 8 or other elongated elements.

In the use of the cultivator which has been described, its coupling member 28 is connected to the three-point lifting device or hitch of a tractor or other operating vehicle in the manner which has been described and the rotary input shaft of the gear box 30 is placed in driven connection with the power take-off shaft of the same tractor ot other vehicle by way of the intermediate telescopic transmission shaft 31. As the cultivator is moved over the ground in the direction A, the tines 25 of the rotating soil working members 22 penetrate into, and break up, the surface of the soil, the plates 20 at the opposite ends of the hollow beam 10A acting as shields which can move upwardly and downwardly about the axes defined by the pivots 18 to match undulations in the surface of the ground over which the cultivator is travelling. The lowermost edges of the plates 20 that engage the surface of the ground are so profiled as to move thereover with a sliding action. Apart from its connection to the tractor or other operating vehicle, the cultivator is supported from the ground surface by the soil compressing member 1 and the effective depth of penetration of the tines 25 into the soil can thus be controlled by raising or lowering the level of the axis of rotation of said member 1 with respect to the frame of the cultivator by manipulating the spindle handles 27 as may be required to move the pins 13 upwardly or downwardly along the curved slots 12. The soil compressing member 1 acts to some extent as a roller and consolidates the strip of ground worked by the foregoing tines 25 but its construction is such that any lumps or the like of soil that have been left unbroken by the tines 25 are crumbled to a satisfactory extent by the tubes 8 or other elongated elements of the compressing member 1.

In the constructions which have so far been described, the soil compressing member 1 is provided with eight tubes 8 or other elongated elements each of which is wound helically around the longitudinal axis of the central shaft 2, the eight tubes 8 or other elements being regularly spaced apart from one another around that axis at intervals of 45°. It will be seen from FIG. 1 of the drawings that the working width of the soil compressing member 1 is substantially the same as the working width of the tined members 22 and thus has a magnitude of substantially 300 centimetres. The overall diameter of the soil compressing member 1 may advantageously be between 20 and 30 centimetres and it is preferred that it should have a magnitude of 24 centimetres. When the soil compressing member 1 is used on heavy and/or sticky soil so that lumps thereof are likely to become stuck between the tubes 8 or other elongated elements, it is preferable to double the angular spacing between those elements to 90° by temporarily removing every second tube 8 or other element from around the shaft 2. This is accomplished merely by withdrawing appropriate safety pins 9 or 36A and sliding the loosely mounted tubes 8 or other elements lengthwise from their abutting engagements with the supports 3 and 4 or 33. It will be remembered that each tube 8 or other element subtends an angle of 90° at the longitudinal axis of the shaft 2 as seen in a direction parallel to that axis so that there will still always be one tube 8 or other element in contact with the ground surface even after the removal of every second tube 8 or other element. Thus, jolting of the soil compressing member 1 during its rotation is avoided even when only four regularly distributed tubes 8 or other elongated elements remain.

The fact that the tubes 8 or other elongated elements are movably connected to the supports 3 and 4 or 33 contributes to preventing soil from sticking to them for any length of time during operation of the cultivator and hence tends to inhibit the formation of large clods of soil. It is not, of course, essential that eight tubes 8 or other elongated elements should be employed. There could, for example, be three, four, six or even 12 such elements in which cases their angular distributions about the axis of the shaft 2 would be at 120°, 90°, 60° and 30° intervals respectively. Provided that the tubes 8 or other elongated elements each subtend a sufficient angle at the axis of rotation of the soil compressing member, some of them can be removed in most cases to increase the angular spacing therebetween and prevent the jamming of lumps of sticky soil therebetween. When only three or four tubes 8 or other elongated elements are employed, it will be realised that the spacing is already sufficiently great to make the removal of any of them generally unnecessary. In very case, the helical arrangement of the tubes 8 or other elongated elements ensures that at least one of them will be in contact with the ground surface at all times so that there will be no appreciable jerking or jolting during operation that is attributable to the particular construction of the soil compressing member 1.

FIGS. 5 and 6 of the drawing show an embodiment in which a soil compressing member 36 has a construction which is generally the same as that of the soil compressing member 1 but which embodies some differences in detail. In this construction, a vertical support which is not illustrated in the drawings is rigidly secured to a central rotary shaft 40 at one end of that shaft and intermediate supports 38 (corresponding to the supports 4 that have previously been described) are each turnable about the axis of the shaft 40 between corresponding pairs of rings or collars 39 that are fixed to the shaft 40. A vertical support 41 (corresp nding to one of the supports 3 that have previously b en described) at the opposite end of the shaft 40 from the one that has been mentioned above is also turnable about the axis of the shaft 40 and is formed with a curved slot 42 (FIG. 6) whose centre of curvature is coincident with the axis that has just been mentioned. A bolt 43 is fastened to a support plate 44 that is rigid with the shaft 40 and located alongside the support 41 and has its screw-threaded shank entered through the slot 42 in the abutting support 41 and a nut 46 carrying an operating arm 45 is received on the screw-threaded shank. With the arrangement which has just been described, the support 41 can be turned angularly about the axis of the shaft 40 within the limits dictated by the curved length of the slot 42 and any chosen angular setting of the support 41 about said axis can be retained merely by tightening the nut 46 on the shank of the bolt 43 in that setting. As the support 41 is turned angularly about the shaft 40, the tubes 8 or other elongated elements, whose opposite ends are connected to the support that occupies a fixed position relative to the shaft 40, will be wound either more, or less, helically around said shaft and the angular extent of the slot 42 around the axis of the shaft is preferably 90° so that the tubes 8 or other elongated elements can occupy any disposition between the substantially rectilinear one which is illustrated and one in which each of them subtends an angle of substantially 90° at the axis of the shaft 40 when the member 36 is viewed in a direction parallel to that axis. The freely turnable intermediate supports 38 will be angularly displaced to different extents about the axis of the shaft 40 in dependence upon the particular setting of the support 41 this is chosen. The adjustability which has been described is useful in obtaining the optimum effect of the soil compressing member 36 with different speeds of rotation thereof. Once again, every second tube 8 or other elongated element around the axis of the shaft 40 can be temporarily detached for dealing with particularly heavy and/or sticky soil and this is readily effected by withdrawing appropriate safety pins 9 as previously described.

Whilst various features of the soil compressing members and cultivator that have been described, and that are illustrated in the accompanying drawings, are set forth in the following claims as inventive features, it is emphasised that the invention is not necessarily limited to those features and that it includes within its scope all of the parts of the described and/or illustrated soil compressing members and cultivator both individually and in various combinations.

What we claim is:

1. An agricultural implement comprising a rotary harrow with a frame supporting a plurality of side-by-side rotable soil-working members, said soil-working members being rotatable about upwardly extending axes and having downwardly extending tines, a supporting roller connected to said frame, said roller being rotatable about a substantially horizontal axis that extends transverse to the direction of travel at the rear of said soil-working members, said roller including spaced apart supports and a plurality of elongated elements helically wound around said supports and said axis of rotation, the lengths of said elements extending at substantially equal distances from said axis, said supports having aperture means around their outer peripheries that receive said elements and said elements comprising the outer soil contacting surface of said roller, the diameter of said roller being substantially equal to the distance between the upwardly extending axes of adjacent soil-working members, said supports including an outer support at each end of the roller and a plurality of further intermediate supports, each elongated element having opposite ends connected to the outer supports and said ends being positionable to subtend an angle that is substantially twice the angle subtended by the ends of successive elements on each outer support, said angle being measured with respect to said axis of rotation of the roller when said roller is seen in side elevation, said roller being connected to the harrow through arm means to support same and control the working depths of said soil-working members, said arm means and roller being vertically adjustable with respect to said frame.

2. An implement as claimed in claim 1, wherein eight elongated soil-contacting elements are spaced apart from one another at regular intervals around said supports and the axis of rotation of said roller.

3. An implement as claimed in claim 1, wherein at least one of said elongated elements is circular in cross-section.

4. An implement as claimed in claim 1, wherein there are twelve soil-working members positioned in a row.

5. An implement as claimed in claim 1, wherein said supports are vertically positioned plate-like members with openings formed adjacent their peripheries and said elongated elements are retained in said openings by retaining pin means.

6. An implement as claimed in claim 1, wherein each elongated element is a flexible tube.

7. An implement as claimed in claim 1, wherein said elongated elements are made of spring steel.

8. An implement as claimed in claim 1, wherein said roller is rotatably mounted on a central shaft and the ends of said shaft are held by said arm means which is pivotably connected to said frame of the harrow, adjusting means connecting said frame and said arm means, said arm means including a pair of angular arms which extend forward with their forward ends being pivotably connected to the forward portion of said frame, pins being secured to said arms intermediate their lengths and said pins are vertically slideable in slots located at the rear of said frame to adjust the working depth of said working members.

9. An implement as claimed in claim 1, wherein said supporting roller is rotatably mounted on an elongated shaft and at least one of said supports is turnable around said shaft to change the angles subtended by the elongated elements, said support being provided with locking means to retain it in any chosen position relative to said shaft.

10. An implement as claimed in claim 9, wherein said turnable support is an outer support.

11. An implement as claimed in claim 1, wherein said aperture means comprises openings and said openings are U-shaped, peripheral recesses in said supports, the open ends of said recesses being closed by retaining means.

* * * * *